(12) United States Patent
Chiga et al.

(10) Patent No.: US 8,097,368 B2
(45) Date of Patent: Jan. 17, 2012

(54) NON-AQUEOUS ELECTROLYTE FOR SECONDARY BATTERY AND NON-AQUEOUS ELECTROLYTE SECONDARY BATTERY

(75) Inventors: Takanobu Chiga, Kobe (JP); Hiroyuki Matsumoto, Kobe (JP); Ryo Mogi, Shibukawa (JP); Osamu Omae, Kurashiki (JP); Masafumi Kobayashi, Kurashiki (JP)

(73) Assignees: Sanyo Electric Co., Ltd., Moriguchi-shi (JP); Kanto Denka Kogyo Co., Ltd., Tokyo (JP)

( * ) Notice: Subject to any disclaimer, the term of this patent is extended or adjusted under 35 U.S.C. 154(b) by 72 days.

(21) Appl. No.: 12/507,228

(22) Filed: Jul. 22, 2009

(65) Prior Publication Data
US 2010/0035162 A1 Feb. 11, 2010

(30) Foreign Application Priority Data

Aug. 5, 2008 (JP) ................................. 2008-201804
May 13, 2009 (JP) ................................. 2009-116046

(51) Int. Cl.
*H01M 10/056* (2010.01)
(52) U.S. Cl. ........................................ 429/343; 429/326
(58) Field of Classification Search .................. 429/343, 429/309, 303, 317, 300, 301, 324, 231.1, 429/329, 326, 200
See application file for complete search history.

(56) References Cited

U.S. PATENT DOCUMENTS

| | | | | |
|---|---|---|---|---|
| 5,925,283 | A * | 7/1999 | Taniuchi et al. | 252/62.2 |
| 6,465,135 | B1 * | 10/2002 | Nishimura et al. | 429/309 |
| 6,495,293 | B1 * | 12/2002 | Arai et al. | 429/307 |
| 2004/0043300 | A1 * | 3/2004 | Utsugi et al. | 429/329 |
| 2005/0191553 | A1 * | 9/2005 | Fujihara et al. | 429/231.1 |
| 2005/0196670 | A1 * | 9/2005 | Yamaguchi et al. | 429/200 |
| 2007/0190412 | A1 * | 8/2007 | Chiga et al. | 429/200 |

FOREIGN PATENT DOCUMENTS

| | | |
|---|---|---|
| JP | 06-020719 A | 1/1994 |
| JP | 08-298134 A | 11/1996 |
| JP | 11-086901 A | 3/1999 |
| JP | 2003-282138 A | 10/2003 |
| JP | 2006-032300 A | 2/2006 |
| JP | 2006-114388 A | 4/2006 |

OTHER PUBLICATIONS

Matrix Scientific Product Sheet, "Difluoroethyl acetate", Matrix Scientific, Columbia, South Carolina, 2009.*
Smith et al., "Electrolytes Containing Fluorinated Ester Co-Solvents for Low-Temperature Li-Ion Cells", 212$^{th}$ ECS Meeting, vol. 11, Issue 29, Oct. 2007, Abstract.*

* cited by examiner

*Primary Examiner* — Jonathan Crepeau
*Assistant Examiner* — Kenneth Douyette
(74) *Attorney, Agent, or Firm* — Westerman, Hattori, Daniels & Adrian, LLP (57) ABSTRACT

The present invention provides a non-aqueous electrolyte secondary battery comprising a positive electrode, a negative electrode, a separator, and a non-aqueous electrolyte, wherein the non-aqueous electrolyte comprises a non-aqueous solvent and lithium salt as an electrolyte, and wherein the non-aqueous solvent contains chain fluorinated carboxylic acid ester represented by the formula $CH_3COOCH_2CH_{3-x}F_x$ (wherein x is 2 or 3) and a film forming chemical decomposed in the range of +1.0 to 3.0 V based on an equilibrium potential between metal lithium and lithium ion.

24 Claims, 4 Drawing Sheets

NON-AQUEOUS ELECTROLYTE FOR SECONDARY BATTERY AND NON-AQUEOUS ELECTROLYTE SECONDARY BATTERY

RELATED APPLICATION

The priority application Number(s) 2008-201804 and 2009-116046 upon which this application is based is hereby incorporated by reference.

BACKGROUND OF THE INVENTION

1. Field of the Invention

The present invention relates to a non-aqueous electrolyte for a secondary battery and a non-aqueous electrolyte secondary battery employing such a non-aqueous electrolyte. More particularly, the present invention relates to an improved non-aqueous electrolyte which suppresses a reaction between an electrode and itself under high temperature and restricts decrease in battery capacity so that long time excellent battery characteristics can be obtained.

2. Description of the Related Art

In recent years, a non-aqueous electrolyte secondary battery, which employs a non-aqueous electrolyte wherein lithium ion is moved between a positive electrode and a negative electrode to perform charging and discharging, has been widely used as a new type of secondary battery featuring high power and high energy density.

Such a non-aqueous electrolyte secondary battery generally employs a non-aqueous electrolyte comprising a mixed solvent wherein cyclic carbonic acid ester, such as ethylene carbonate, and chain carbonic acid ester, such as diethyl carbonate, ethyl methyl carbonate, and dimethyl carbonate, are mixed, and lithium salt, such as $LiPF_6$ or $LiBF_4$, dissolved in the mixed solvent.

However, the non-aqueous electrolyte secondary battery using the above-described non-aqueous electrolyte has a problem as follows. When the non-aqueous electrolyte secondary battery is left in charging condition under high temperature for evaluating durability, a side reaction wherein the non-aqueous electrolyte reacts with the positive electrode and the negative electrode is caused, and battery capacity is decreased.

Therefore, it has disclosed that a variety of chain fluorinated carboxylic acid ester is used as a solvent of a non-aqueous electrolyte or as an additive to the non-aqueous electrolyte (See patent documents 1-6 below).
[Patent Document 1] JP-A 8-298134
[Patent Document 2] JP-A 11-86901
[Patent Document 3] JP-A 6-20719
[Patent Document 4] JP-A 2003-282138
[Patent Document 5] JP-A 2006-32300
[Patent Document 6] JP-A 2006-114388

Generally, if a non-aqueous solvent is fluorinated, oxidation-resistance of solvent is improved, and as a result, a reaction between a positive electrode and a non-aqueous electrolyte is suppressed. However, if the non-aqueous solvent is fluorinated, viscosity of the non-aqueous electrolyte is increased, and rise of reactivity with a negative electrode is caused because of lowering of reduction-resistance. Especially, the reactivity with negative electrode is greatly influenced by a position where fluorine is introduced.

However, in each patent document indicated as above, types of chain fluorinated carboxylic acid ester used are varied. As to a position of carbon where fluorine is introduced, the patent documents 1, 2 and 5 suggest it is preferable to replace hydrogen combined with α carbon with fluorine, and the patent documents 3 and 4 suggest that α carbon and any other carbon may be used.

Further, if chain fluorinated carboxylic acid ester wherein hydrogen combined with α carbon is replaced with fluorine, for example, ethyl trifluoroacetate $CF_3COOCH_2CH_3$, is used as the non-aqueous solvent, lithium salt such as $LiPF_6$ is not dissolved properly. If ethyl difluoroacetate $CHF_2COOCH_2CH_3$ is used, although lithium salt such as $LiPF_6$ is dissolved, the reactivity with the negative electrode is risen, and battery capacity is greatly decreased and battery characteristics are deteriorated in the case that the non-aqueous electrolyte secondary battery is left in charging condition under high temperature.

As a result, the use of chain fluorinated carboxylic acid ester wherein hydrogen combined with α carbon is replaced with fluorine can not attain sufficient battery characteristics.

Still further, if chain fluorinated carboxylic acid ester wherein hydrogen combined with carbon which is not α carbon is replaced with fluorine is used as the non-aqueous solvent of the non-aqueous electrolyte, the reactivity with the negative electrode is lowered. However, in the case that the non-aqueous electrolyte secondary battery is left in charging condition under high temperature, there remain problems that the battery capacity is decreased and the battery characteristics are deteriorated.

Also, when such a chain fluorinated carboxylic acid ester is used in combination of another non-aqueous solvent, if the non-aqueous solvent to be combined is not appropriate, initial capacity of the non-aqueous electrolyte secondary battery is decreased. Furthermore, in the case that the non-aqueous electrolyte secondary battery is left in charging condition under high temperature, the battery capacity and the battery characteristics are decreased.

As is described above, although fluorination of non-aqueous solvent contributes to suppression of the reaction between the positive electrode and itself, the reactivity between the negative electrode and itself is increased, so that excellent battery characteristics can not be obtained.

SUMMARY OF THE INVENTION

It is an object of the invention to solve the aforementioned problems of the non-aqueous electrolyte secondary battery using the non-aqueous electrolyte.

Specifically, it is the object of the invention to provide a non-aqueous electrolyte secondary battery, which restricts decrease of battery capacity by suppressing a reaction between a non-aqueous electrolyte and an electrode under high temperature and maintains favorable battery characteristics for a long period of time.

The non-aqueous electrolyte according to the present invention comprises a non-aqueous solvent dissolving lithium salt which contains chain fluorinated carboxylic acid ester represented by the below formula (1) and a film forming chemical decomposed in the range of +1.0 to 3.0 V based on an equilibrium potential between metal lithium and lithium ion.

$$CH_3COOCH_2CH_{3-x}F_x \tag{1}$$

In the above formula (1), x is 2 or 3.

Thus, it is found that use of the above-described chain fluorinated carboxylic acid ester wherein hydrogen combined with carbon which is not α carbon is replaced with fluorine solves the above-mentioned problems associated with the use of the above-described chain fluorinated carboxylic acid ester wherein hydrogen combined with α carbon is replaced with fluorine.

Examples of usable chain fluorinated carboxylic acid ester may include 2,2-difluoroethyl acetate $CH_3COOCH_2CHF_2$ and 2,2,2-trifluoroethyl acetate $CH_3COOCH_2CF_3$.

If the amount of chain fluorinated carboxylic acid ester in the non-aqueous solvent is insufficient, sufficient improvement of the above-described battery characteristics under high temperature is hardly attained. On the other hand, if the above-mentioned amount is excessive, the amount of the film forming chemical compound contained in the non-aqueous electrolyte is decreased, so that a sufficient film is not formed on the negative electrode. Therefore, the amount of chain fluorinated carboxylic acid ester to the whole amount of non-aqueous solvent may preferably be in the range of 5 to 90 volume %, or more preferably be in the range of 20 to 80 volume %.

In the case that the film forming chemical compound which is decomposed in the range of +1.0 to 3.0 V based on the equilibrium potential between metal lithium and lithium ion is contained in the non-aqueous solvent, a decomposition of chain fluorinated carboxylic acid ester resulting from a reaction between the negative electrode and itself is restricted or said chain fluorinated carboxylic acid ester partially contributes to form the film on the negative electrode and suppresses excessive decomposition.

Here, $LiPF_6$ is dissolved in a concentration of 1 mol/l to chain fluorinated carboxylic acid ester such as $CH_3COOCH_2CHF_2$ and $CH_3COOCH_2CF_3$, a graphite electrode is employed as a working electrode, and CV measurement is conducted in a condition that sweep rate is 1 mV/sec. In such a case, $CH_3COOCH_2CHF_2$ undergoes reductive decomposition at about +1.0 V based on the equilibrium potential between metal lithium and lithium ion and $CH_3COOCH_2CF_3$ undergoes reductive decomposition at about +0.8 V based on the equilibrium potential between metal lithium and lithium ion. Therefore, the use of the non-aqueous solvent containing the film forming chemical compound decomposed at +1.0 V or more makes it possible to suppress the decomposition of chain fluorinated carboxylic acid ester resulting from the reaction between the negative electrode and itself or allow chain fluorinated carboxylic acid ester to partially contribute to form the film on the negative electrode. As a result, excessive decomposition of chain fluorinated carboxylic acid ester is suppressed. Further, because the potential of the graphite electrode when the non-aqueous electrolyte is poured thereinto is about +3.0 V, the film forming chemical compound decomposed at +3.0 V or less should be contained.

The use of such a film forming chemical compound makes it possible to suppress the reaction between chain fluorinated carboxylic acid ester and the negative electrode, and the use of such a chain fluorinated carboxylic acid ester as the solvent makes it possible to suppress a reaction between the positive electrode and itself. As a result, favorable battery characteristics can be obtained.

Examples of usable film forming chemical compound include at least one type selected from 4-fluoroethylene carbonate and its derivatives, ethylene sulfite and its derivatives, vinyl ethylene carbonate and its derivatives, $LiB(C_2O_4)_2$ and $LiBF_2(C_2O_4)$. Especially, 4-fluoroethylene carbonate, which makes a suitable film on the negative electrode and has effective function as the non-aqueous solvent, is preferably used.

Each of decomposition potentials of 4-fluoroethylene carbonate, ethylene sulfite, vinyl ethylene carbonate, $LiB(C_2O_4)_2$, and $LiBF_2(C_2O_4)$ are about 1.2 V, about 1.1 V, about 1.3 V, about 2.0 V and about 1.7 V based on the equilibrium potential between metal lithium and lithium ion. Further, among the derivatives, 4-fluoroethylene carbonate derivatives, ethylene sulfite derivatives and vinyl ethylene carbonate derivatives, which have the decomposition potential in the range of +1.0 V to +3.0 V, preferably in the range of +1.1 V to 2.0 V, may be used.

In the case where 4-fluoroethylene carbonate is contained as the film forming chemical compound in the non-aqueous solvent, if the amount of 4-fluoroethylene carbonate is insufficient, a sufficient film is not formed on the negative electrode, and reductive decomposition of chain fluorinated carboxylic acid ester is caused. As a result, in the case that the non-aqueous electrolyte secondary battery is left in charging condition under high temperature, storage properties are degraded. On the other hand, if the amount of 4-fluoroethylene carbonate is excessive, viscosity of the non-aqueous electrolyte rises and load characteristics are decreased. Therefore, the amount of 4-fluoroethylene carbonate to the whole amount of non-aqueous solvent may preferably be in the range of 2 to 40 volume %, or more preferably be in the range of 5 to 30 volume %.

In the case that ethylene sulfite and its derivatives and/or vinyl ethylene carbonate and its derivatives are used as the film forming chemical compound, its amount to the whole amount of the non-aqueous electrolyte may preferably be in the range of 0.1 to 10 weight %, more preferably be in the range of 0.2 to 5 weight %. In the case that lithium salt such as $LiB(C_2O_4)_2$ and $LiBF_2(C_2O_4)$ is used as the film forming chemical compound, its amount to the non-aqueous solvent may preferably be in the range of 0.01 to 0.2 mol/l, more preferably be in the range of 0.02 to 0.1 mol/l. These ranges are determined by the following reason. If the amount of the film forming chemical compound is smaller than the above defined range, the sufficient film is not formed on the negative electrode. As a result, the reductive decomposition of chain fluorinated carboxylic acid ester is caused, and favorable storage properties in charging condition under high temperature can not be obtained. On the other hand, if the amount of the film forming chemical compound is larger than the above defined range, the decomposition of the film forming chemical compound occurs often, and there is a fear that increment of inner resistance and generation of gas are caused.

In the non-aqueous electrolyte, another non-aqueous solvent may be added in addition to said chain fluorinated carboxylic acid ester and said film forming chemical compound. Favorable Examples of such usable non-aqueous solvent include dimethyl carbonate, ethyl methyl carbonate, methyl propyl carbonate, diethyl carbonate, methyl acetate, ethyl acetate, propyl acetate, methyl propionate, and ethyl propionate. Especially, addition of at least one type of low viscosity solvent selected from methyl acetate, methyl propionate, ethyl acetate, dimethyl carbonate and ethyl methyl carbonate is favorable to decrease viscosity of the non-aqueous electrolyte for improvement of load characteristics. Furthermore, a mixture of ethylene carbonate, propylene carbonate, and γ-butyrolactone, which are high permittivity solvent, may be used to enhance conductivity of the non-aqueous electrolyte.

Further, as the lithium salt to be dissolved in the non-aqueous solvent, in addition to $LiB(C_2O_4)_2$ and $LiBF_2(C_2O_4)$, lithium salt which has been generally used in the non-aqueous electrolyte secondary battery may be employed. Examples of usable lithium salt include $LiPF_6$, $LiBF_4$, $LiCF_3SO_3$, $LiClO_4$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$. Especially, it is preferable to use $LiPF_6$, $LiBF_4$, and $LiN(CF_3SO_2)_2$.

In the non-aqueous electrolyte secondary battery according to the present invention, the non-aqueous electrolyte prepared as above is used.

In the non-aqueous electrolyte secondary battery according to the present invention, any known material capable of storing and releasing lithium and having a high potential may be used as positive electrode active material for the positive electrode. For example, lithium-transition metal oxide having layer structure, spinel structure or olivin structure may be used alone or in combination of two or more. Especially, lithium-transition metal oxide having layer structure is preferably used to obtain a non-aqueous electrolyte secondary battery with high energy density. For example, it is preferable to use lithium-transition metal oxide such as lithium-cobalt oxide, lithium-cobalt-nickel-manganese oxide or lithium-cobalt-nickel-aluminum oxide. Especially, in the viewpoint of stability of crystal structure, lithium cobaltate incorporating Al or Mg in its crystal inside and adhering Zr to its particle surface, is preferably used.

In the non-aqueous electrolyte secondary battery according to the present invention, any known material capable of storing and releasing lithium may be used as negative electrode active material for the negative electrode. Examples of usable negative electrode active material include lithium alloy, carbon material, and metal oxide. Specifically, examples of usable lithium alloy include metal lithium, lithium-aluminum alloy, lithium-lead alloy, lithium-silicon alloy and lithium-tin alloy. Examples of usable carbon material include graphite, cokes and baked organic materials. As the metal oxide, $SnO_2$, SnO, and $TiO_2$, which is the metal oxide having a lower potential than that of positive electrode active material, is used. Especially, the carbon material of graphite, which has small volume change associated with storing and releasing of lithium and is excellent in reversibility, is preferably used.

In the non-aqueous electrolyte according to the present invention, a non-aqueous solvent comprising chain fluorinated carboxylic acid ester represented by the above formula (1) and film forming chemical compound decomposed in the range of +1.0 to 3.0 V based on the equilibrium potential between metal lithium and lithium ion is used.

In the non-aqueous electrolyte secondary battery using the above-described non-aqueous electrolyte, the film forming chemical compound contributes to form a suitable film on the negative electrode and the decomposition of chain fluorinated carboxylic acid ester is suppressed. Further, the reaction between the positive electrode and the non-aqueous electrolyte is restricted by the using of chain fluorinated carboxylic acid ester as the solvent. As a result, decrease of the battery capacity is restricted even under high temperature and favorable battery characteristics can be obtained.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

A non-aqueous electrolyte secondary battery using a non-aqueous electrolyte for secondary battery according to the invention will hereinbelow be described in detail by way of examples thereof. In addition, comparative examples are also cited to clarify that the non-aqueous electrolyte secondary battery according to the examples of the invention shows improved storage properties under high temperature.

Example 1

Figure 1:
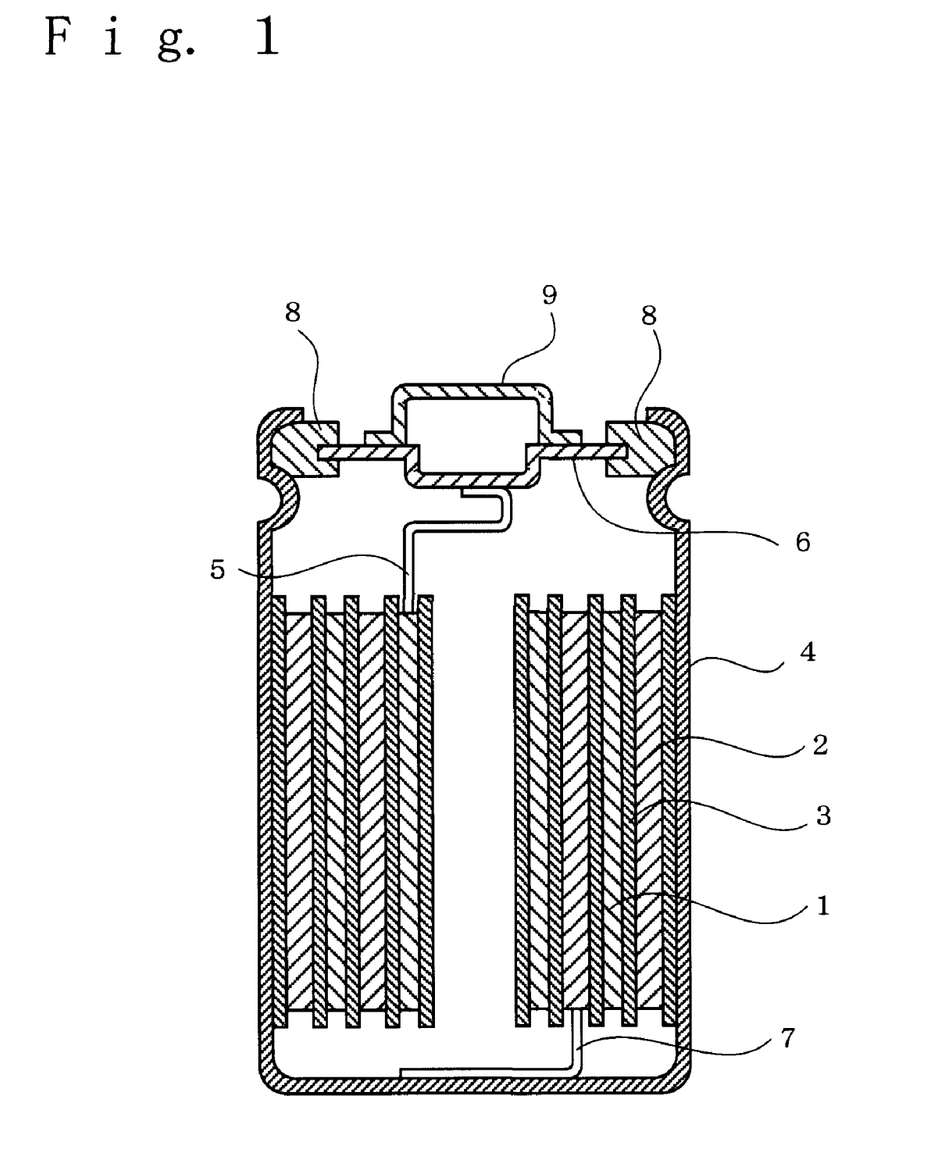
FIG. 1 is a schematic cross-sectional view of a non-aqueous electrolyte secondary battery fabricated in Examples and Comparative Examples of the present invention.

In Example 1, a cylinder-shaped non-aqueous electrolyte secondary battery as illustrated in FIG. 1 was fabricated using a positive electrode, a negative electrode, and a non-aqueous electrolyte that were prepared in the following manner. The non-aqueous electrolyte secondary battery had a charge cut-off voltage of 4.2 V and a nominal capacity of 2300 mAh.

Preparation of Positive Electrode

A solid solution prepared by doping 1.0 mol % of Al and 1.0 mol % of Mg in lithium cobaltate $LiCoO_2$ and adding 0.05 mol % of Zr to its particle surface was used as a positive electrode active material. Then, the positive electrode active material, carbon as a conductive agent, and polyvinylidene fluoride as a binder were weighed out in a weight ratio of 95:2.5:2.5. These materials were blended with N-methyl-2-pyrrolidone solution to give positive electrode slurry. The resultant slurry was applied to both sides of aluminum foil, dried and rolled to prepare a positive electrode.

Preparation of Negative Electrode

Graphite as a negative electrode active material, styrene-butadiene rubber as a binder, and carboxymethylcellose as a viscosity improver were weighed out in a weight ratio of 97.5:1.5:1. These materials were blended with an aqueous solution to give negative electrode slurry. The resultant slurry was applied to both sides of copper foil, dried and rolled to prepare a negative electrode.

Preparation of Non-Aqueous Electrolyte

A non-aqueous electrolyte was prepared as follows. As film forming chemical compound, 4-fluoroethylene carbonate (4-FEC) decomposed in the range of +1.0 to 3.0 V based on an equilibrium potential between metal lithium and lithium ion was used. As chain fluorinated carboxylic acid ester, 2,2-difluoroethyl acetate $CH_3COOCH_2CHF_2$ represented by the above formula (1) wherein x is 2 was used. The foregoing 4-fluoroethylene carbonate (4-FEC) and 2,2-difluoroethyl acetate ($CH_3COOCH_2CHF_2$) were mixed at a volume ratio of 2:8 to prepare mixed solvent as a non-aqueous solvent. Then, lithium hexafluorophosphate $LiPF_6$ was dissolved in the mixed solvent in a concentration of 1 mol/l. Thus was prepared the non-aqueous electrolyte.

The following is a method of synthesizing 2,2-difluoroethyl acetate ($CH_3COOCH_2CHF_2$) used as chain fluorinated carboxylic acid ester described above.

128 g (1.56 mol) of 2,2-difluoroethanol and 150 ml of diethyl ether were poured to a four-neck flask of 2 liter, and 240 g (2.37 mol/1.52 eq) of trietylamine was added. Then, the resultant mixture was ice-cooled and stirred while gradually dropping a solution diluting 180 g (2.29 mol/1.47 eq) of acetyl chloride with 150 ml of diethyl ether by dropping funnel. While dropping, the temperature of the solution was kept between 20 and 30° C. The period of time for dropping was 2 hours. After that, the resultant mixed solution was stirred for 1 hour at room temperature and 600 ml of water was added, then, the reaction was completed. Subsequently, an organic phase was separated by the separatory funnel and dried using magnesium sulfate. Thereafter, purification by distilling was conducted to obtain 82 g of 2,2-difluoroethyl acetate ($CH_3COOCH_2CHF_2$) of which yield was 42.4%.

A non-aqueous electrolyte secondary battery of Examples was fabricated as follows. As illustrated in FIG. 1, as a separator 3 a fine porous film made of polyethylene having lithium-ion mobility was interposed between a positive electrode 1 and a negative electrode 2, that were prepared in the above-described manner, and these components were spirally coiled and accommodated in a battery case 4. Then, the non-aqueous electrolyte prepared as above was poured into the battery case 4 and the battery case 4 was sealed. The positive electrode 1 was connected to a positive electrode external terminal 9 attached to a positive electrode cap 6 via a positive electrode tab 5, while the negative electrode 2 was connected to the battery case 4 via a negative electrode tab 7. The battery case 4 and the positive electrode cap 6 were electrically insulated with an insulative packing 8.

Example 2

In Example 2, a mixed solvent as the non-aqueous solvent of the non-aqueous electrolyte was prepared as follows. The foregoing 4-fluoroethylene carbonate (4-FEC) used in Example 1 as film forming chemical compound was mixed with 2,2,2-trifluoroethyl acetate ($CH_3COOCH_2CF_3$) as chain fluorinated carboxylic acid ester represented by the above formula (1) wherein x is 3. The volume ratio of 4-fluoroethylene carbonate and 2,2,2-trifluoroethyl acetate was 2:8. Thus, except for the non-aqueous solvent, a non-aqueous electrolyte secondary battery of Example 2 was fabricated in the same manner as in Example 1.

The following is a method of synthesizing 2,2,2-trifluoroethyl acetate ($CH_3COOCH_2CF_3$) used as chain fluorinated carboxylic acid ester described above.

85 g (0.85 mol) of trifluoroethanol and 80 ml of diethyl ether were poured to a four-neck flask of 2 liter, and further 129 g (1.27 mmol/1.49 eq) of triethylamine was added thereto. Then, the resultant mixture was ice-cooled and stirred while dropping a solution diluting 100 g (1.27 mol/1.49 eq) of acetyl chloride with 80 ml of diethyl ether by dropping funnel. While dropping, the temperature of the resultant reacted solution was kept between 27 to 35° C. The period of time for dropping was 20 minutes. After that, the resultant mixed solution was stirred for 1.5 hours at room temperature and 350 ml of water was added, then, the reaction was completed. Subsequently, an organic phase was separated by the separatory funnel and dried using magnesium sulfate. Thereafter, purification by distilling was conducted to obtain 88 g of 2,2,2-trifluoroethyl acetate ($CH_3COOCH_2CF_3$) of which yield was 72.9%.

Example 3

In Example 3, a mixed solvent as the non-aqueous solvent of the non-aqueous electrolyte was prepared as follows. The foregoing 4-fluoroethylene carbonate (4-FEC) used in Example 1 as film forming chemical compound was mixed with 2,2-difluoroethyl acetate ($CH_3COOCH_2CHF_2$) used in Example 1 as chain fluorinated carboxylic acid ester at a volume ratio of 1:9. Except for the non-aqueous solvent, a non-aqueous electrolyte secondary battery of Example 3 was fabricated in the same manner as in Example 1.

Example 4

In Example 4, a mixed solvent as the non-aqueous solvent of the non-aqueous electrolyte was prepared as follows. The foregoing 4-fluoroethylene carbonate (4-FEC) used in Example 1 as film forming chemical compound, 2,2-difluoroethyl acetate ($CH_3COOCH_2CHF_2$) used in Example 1 as chain fluorinated carboxylic acid ester, and dimethyl carbonate (DMC) were mixed at a volume ratio of 2:4:4. Except for the non-aqueous solvent, a non-aqueous electrolyte secondary battery of Example 4 was fabricated in the same manner as in Example 1.

Example 5

In Example 5, a mixed solvent as the non-aqueous solvent of the non-aqueous electrolyte was prepared as follows. The foregoing 4-fluoroethylene carbonate (4-FEC) used in Example 1 as film forming chemical compound, 2,2-difluoroethyl acetate ($CH_3COOCH_2CHF_2$) used in Example 1 as chain fluorinated carboxylic acid ester, and dimethyl carbonate (DMC) were mixed at a volume ratio of 2:4:4. Then, lithium hexafluorophosphate $LiPF_6$ was dissolved in a concentration of 1 mol/l to the mixed solvent, and 2 weight % of vinyl ethylene carbonate (VEC) as film forming chemical compound was further added thereto. Except for the non-aqueous solvent, a non-aqueous electrolyte secondary battery of Example 5 was fabricated in the same manner as in Example 1.

Example 6

In Example 6, a mixed solvent as the non-aqueous solvent of the non-aqueous electrolyte was prepared as follows. The foregoing 4-fluoroethylene carbonate (4-FEC) used in Example 1 as film forming chemical compound, 2,2-difluoroethyl acetate ($CH_3COOCH_2CHF_2$) used in Example 1 as chain fluorinated carboxylic acid ester, and dimethyl carbonate (DMC) were mixed at a volume ratio of 2:4:4. Then, lithium hexafluorophosphate $LiPF_6$ was dissolved in a concentration of 1 mol/l to the mixed solvent, and 2 weight % of ethylene sulfite (ES) as film forming chemical compound was further added thereto. Except for the non-aqueous solvent, a non-aqueous electrolyte secondary battery of Example 6 was fabricated in the same manner as in Example 1.

Example 7

In Example 7, a mixed solvent as the non-aqueous solvent of the non-aqueous electrolyte was prepared as follows. The foregoing 4-fluoroethylene carbonate (4-FEC) used in Example 1 as film forming chemical compound, 2,2-difluoroethyl acetate ($CH_3COOCH_2CHF_2$) used in Example 1 as chain fluorinated carboxylic acid ester, and dimethyl carbonate (DMC) were mixed at a volume ratio of 2:4:4. Then, lithium hexafluorophosphate $LiPF_6$ was dissolved in a concentration of 1 mol/l to the mixed solvent, and $LiB(C_2O_4)_2$ as film forming chemical compound was further dissolved in a concentration of 0.05 mol/l thereto. Except for the non-aqueous solvent, a non-aqueous electrolyte secondary battery of Example 7 was fabricated in the same manner as in Example 1.

Comparative Example 1

In Comparative Example 1, as the non-aqueous solvent, a mixed solvent was prepared by mixing ethylene carbonate (EC) with ethyl methyl carbonate (EMC) at a volume ratio of 3:7. Then, lithium hexafluorophosphate $LiPF_6$ was dissolved in a concentration of 1 mol/l to the mixed solvent, and 2 weight % of vinylene carbonate (VC) as film forming chemical compound was further added thereto. Thus, a non-aqueous electrolyte was prepared. A non-aqueous electrolyte secondary battery of Comparative Example 1 was fabricated in the same manner as in Example 1 except for the non-aqueous electrolyte.

Comparative Example 2

In Comparative Example 2, a mixed solvent as the non-aqueous solvent of the non-aqueous electrolyte was prepared as follows. The foregoing 4-fluoroethylene carbonate (4-FEC) used in Example 1 as film forming chemical compound was mixed with ($CH_3COOCH_2CH_3$) of chain carboxylic acid ester which was not fluorinated at a volume ratio of 2:8. A non-aqueous electrolyte secondary battery of Comparative Example 2 was fabricated in the same manner as in Example 1 except for the non-aqueous solvent.

Comparative Example 3

In Comparative Example 3, a mixed solvent as the non-aqueous solvent of the non-aqueous electrolyte was prepared as follows. The foregoing 4-fluoroethylene carbonate (4-FEC) used in Example 1 as film forming chemical compound and 2-fluoroethyl acetate ($CH_3COOCH_2CH_2F$) as chain fluorinated carboxylic acid ester represented by the above formula (1) wherein x is 1 were mixed at a volume ratio of 2:8. A non-aqueous electrolyte secondary battery of Comparative Example 3 was fabricated in the same manner as in Example 1 except for the non-aqueous solvent.

The following is a method of synthesizing 2-fluoroethyl acetate ($CH_3COOCH_2CH_2F$) used as chain fluorinated carboxylic acid ester described above.

100 g (1.56 mol) of 2-fluoroethanol and 150 ml of diethyl ether were poured to a four-neck flask of 2 liter, and 240 g (2.37 mmol/1.52 eq) of triethylamine was further added thereto. Then, the resultant mixture was ice-cooled and stirred while dropping a solution diluting 180 g (2.29 mol/1.47 eq) of acetyl chloride with 150 ml of diethyl ether by dropping funnel. While dropping, the temperature of the resultant reacted solution was kept between 20 and 30° C. The period of time for dropping was 2 hours. After that, the resultant mixed solution was stirred for 1 hours at room temperature and 600 ml of water was added, then, the reaction was completed. Subsequently, an organic phase was separated by the separatory funnel and dried using magnesium sulfate. Thereafter, purification by distilling was conducted to obtain 76 g of 2-fluoroethyl acetate ($CH_3COOCH_2CH_2F$) of which yield was 45.9%.

Comparative Example 4

In Comparative Example 4, a mixed solvent as the non-aqueous solvent of the non-aqueous electrolyte was prepared as follows. The foregoing 4-fluoroethylene carbonate (4-FEC) used in Example 1 as film forming chemical compound and $CHF_2COOCH_2CH_3$ of chain carboxylic acid ester wherein hydrogen combined with α carbon was replaced with fluorine were mixed at a volume ratio of 2:8. A non-aqueous electrolyte secondary battery of Comparative Example 4 was fabricated in the same manner as in Example 1 except for the non-aqueous solvent.

Comparative Example 5

In Comparative Example 5, a mixed solvent as the non-aqueous solvent of the non-aqueous electrolyte was prepared as follows. Ethylene carbonate having decomposition potential of 0.6 V being out of the range of +1.0 to 3.0 V based on the equilibrium potential between metal lithium and lithium ion and 2,2-difluoroethyl acetate ($CH_3COOCH_2CHF_2$) used in Example 1 as chain fluorinated carboxylic acid ester were mixed at a volume ratio of 2:8. A non-aqueous electrolyte secondary battery of Comparative Example 5 was fabricated in the same manner as in Example 1 except for the non-aqueous solvent.

Comparative Example 6

In Comparative Example 6, a mixed solvent as the non-aqueous solvent of the non-aqueous electrolyte was prepared as follows. Ethylene carbonate having decomposition potential of 0.6 V being out of the range of +1.0 to 3.0 V based on the equilibrium potential between metal lithium and lithium ion and 2,2,2-trifluoroethyl acetate ($CH_3COOCH_2CF_3$) used in Example 2 as chain fluorinated carboxylic acid ester were mixed at a volume ratio of 2:8. A non-aqueous electrolyte secondary battery of Comparative Example 6 was fabricated in the same manner as in Example 1 except for the non-aqueous solvent.

Next, each of the non-aqueous electrolyte secondary batteries of Examples 1 to 7 and Comparative Examples 1 to 6 was charged at a constant current of 460 mA at 25° C. until a voltage became 4.2 V. Further, each of the non-aqueous electrolyte secondary batteries was charged at a constant voltage of 4.2 V until a current became 46 mA and discharged at the constant current of 460 mA until the voltage became 2.75 V to measure an initial discharge capacity.

Each initial discharge capacity of each non-aqueous electrolyte secondary battery was determined with respect to the initial discharge capacity of Comparative Example 1, which was taken as 100. The results are shown in Table 1 below. In Table 1, each material is abbreviated as follows, 4-fluoroethylene carbonate is as 4-FEC, dimethyl carbonate is as DMC, vinyl ethylene carbonate is as VEC, ethylene sulfite is as ES, ethylene carbonate is as EC, ethyl methyl carbonate is as EMC, and vinylene carbonate is as VC.

TABLE 1

| | Non-Aqueous Solvent (volume ratio) | Initial Discharge Capacity |
|---|---|---|
| Example 1 | 4-FEC:$CH_3COOCH_2CHF_2$ (2:8) | 99 |
| Example 2 | 4-FEC:$CH_3COOCH_2CF_3$ (2:8) | 99 |
| Example 3 | 4-FEC:$CH_3COOCH_2CHF_2$ (1:9) | 99 |
| Example 4 | 4-FEC:$CH_3COOCH_2CHF_2$:DMC (2:4:4) | 100 |
| Example 5 | 4-FEC:$CH_3COOCH_2CHF_2$:DMC (2:4:4) + VEC (2 wt %) | 100 |
| Example 6 | 4-FEC:$CH_3COOCH_2CHF_2$:DMC (2:4:4) + ES (2 wt %) | 100 |
| Example 7 | 4-FEC:$CH_3COOCH_2CHF_2$:DMC (2:4:4) + $LiB(C_2O_4)_2$ (0.05M) | 100 |
| Comp. Ex. 1 | EC:EMC (3:7) + VC (2 wt %) | 100 |
| Comp. Ex. 2 | 4-FEC:$CH_3COOCH_2CH_3$ (2:8) | 100 |

TABLE 1-continued

| | Non-Aqueous Solvent (volume ratio) | Initial Discharge Capacity |
|---|---|---|
| Comp. Ex. 3 | 4-FEC:CH$_3$COOCH$_2$CH$_2$F (2:8) | 99 |
| Comp. Ex. 4 | 4-FEC:CHF$_2$COOCH$_2$CH$_3$ (2:8) | 96 |
| Comp. Ex. 5 | EC:CH$_3$COOCH$_2$CHF$_2$ (2:8) | 95 |
| Comp. Ex. 6 | EC:CH$_3$COOCH$_2$CF$_3$ (2:8) | 86 |

As is apparent from the results, in each of the non-aqueous electrolyte secondary batteries of Comparative Examples 5 and 6 utilizing as the film forming chemical compound ethylene carbonate having decomposition potential of 0.6 V which is out of the range of +1.0 to 3.0 V based on the equilibrium potential between metal lithium and lithium ion, even if the CH$_3$COOCH$_2$CHF$_2$ or CH$_3$COOCH$_2$CF$_3$ as chain fluorinated carboxylic acid ester represented by the above formula (1) wherein x is 2 or 3 was used in the non-aqueous solvent, initial discharge capacity is decreased as compared with each of the non-aqueous electrolyte secondary batteries of Examples 1 to 7 and Comparative Examples 1 to 4.

Next, each of the non-aqueous electrolyte secondary batteries of Examples 1 to 7 and Comparative Examples 1 to 6 was charged at the constant current of 460 mA at 25° C. until a voltage became 4.2 V. Further, each of the non-aqueous electrolyte secondary batteries was charged at the constant voltage of 4.2 V until a current became 46 mA and discharged at the constant current of 460 mA until the voltage became 2.75 V to measure discharge capacity D$_1$ before storage.

Then, each of the non-aqueous electrolyte secondary batteries was charged at a constant current of 2300 mA at 25° C. until the voltage became 4.2 V. Further, each of the non-aqueous electrolyte secondary batteries was charged at the constant voltage of 4.2 V until the current became 46 mA. In such a condition, each of the batteries was preserved in a climate chamber at 60° C. for 10 days. After that, each of the batteries after storage was discharged at the constant current of 460 mA at 25° C. until the voltage became 2.75 V to measure residual capacity D$_2$ after storage.

Subsequently, each of the non-aqueous electrolyte secondary batteries was charged at the constant current of 460 mA at 25° C. until the voltage became 4.2 V. Further, each of the non-aqueous electrolyte secondary batteries was charged at the constant voltage of 4.2 V until the current became 46 mA and discharged at the constant current of 460 mA until the voltage became 2.75 V to measure recovery capacity D$_3$ after storage.

Then, discharge capacity D$_1$ before storage, residual capacity D$_2$ after storage and recovery capacity D$_3$ after storage, which were determined as described above, were applied to the following equation to find percentage of residual capacity (%) and percentage of recovery capacity (%) of each of the non-aqueous electrolyte secondary batteries of Examples 1 to 6 and Comparative Examples 1 to 7 after storage. The results were shown in Table 2 below.

Percentage of residual capacity (%)=($D_2/D_1$)×100

Percentage of recovery capacity (%)=($D_3/D_1$)×100

TABLE 2

| | Non-Aqueous Solvent (volume ratio) | Percentage of Residual Capacity (%) | Percentage of Recovery Capacity (%) |
|---|---|---|---|
| Ex. 1 | 4-FEC:CH$_3$COOCH$_2$CHF$_2$ (2:8) | 90 | 94 |
| Ex. 2 | 4-FEC:CH$_3$COOCH$_2$CF$_3$ (2:8) | 90 | 94 |
| Ex. 3 | 4-FEC:CH$_3$COOCH$_2$CHF$_2$ (1:9) | 91 | 95 |
| Ex. 4 | 4-FEC:CH$_3$COOCH$_2$CHF$_2$:DMC (2:4:4) | 91 | 95 |
| Ex. 5 | 4-FEC:CH$_3$COOCH$_2$CHF$_2$:DMC (2:4:4) + VEC (2 wt %) | 91 | 95 |
| Ex. 6 | 4-FEC:CH$_3$COOCH$_2$CHF$_2$:DMC (2:4:4) + ES (2 wt %) | 91 | 96 |
| Ex. 7 | 4-FEC:CH$_3$COOCH$_2$CHF$_2$:DMC (2:4:4) + LiB(C$_2$O$_4$)$_2$ (0.05M) | 92 | 96 |
| Comp. Ex. 1 | EC:EMC (3:7) + VC (2 wt %) | 83 | 93 |
| Comp. Ex. 2 | 4-FEC:CH$_3$COOCH$_2$CH$_3$ (2:8) | 82 | 89 |
| Comp. Ex. 3 | 4-FEC:CH$_3$COOCH$_2$CH$_2$F (2:8) | 55 | 62 |
| Comp. Ex. 4 | 4-FEC:CHF$_2$COOCH$_2$CH$_3$ (2:8) | 1 | 14 |
| Comp. Ex. 5 | EC:CH$_3$COOCH$_2$CHF$_2$ (2:8) | 48 | 59 |
| Comp. Ex. 6 | EC:CH$_3$COOCH$_2$CF$_3$ (2:8) | 54 | 63 |

According to the result of comparison, each of the non-aqueous electrolyte secondary batteries of Examples 1 to 7 exhibited obvious improvement in both of percentage of residual capacity and percentage of recovery capacity after storage as compared with each of Comparative Examples 1, 2, 3, 5 and 6. Here, the secondary batteries of Examples 1 to 6 utilized the mixed solvent containing 4-fluoroethylene carbonate as film forming chemical compound having decomposition potential of the range of +1.0 to 3.0 V based on the equilibrium potential between metal lithium and lithium ion and chain fluorinated carboxylic acid ester CH$_3$COOCH$_2$CHF$_2$ and CH$_3$COOCH$_2$CF$_3$ represented by the above formula (1) wherein x is 2 or 3, the secondary battery of Comparative Example 2 utilized the mixed solvent containing chain carboxylic acid ester which was not fluorinated, the secondary battery of Comparative Example 3 utilized the mixed solvent containing chain fluorinated carboxylic acid ester CH$_3$COOCH$_2$CH$_2$F represented by the above formula (1) wherein x is 1, the secondary batteries of Comparative Examples 5 and 6 utilized the mixed solvent containing ethylene carbonate having decomposition potential being out of the range of +1.0 to 3.0 V based on the equilibrium potential between metal lithium and lithium ion, and the secondary battery of Comparative Example 1 utilized the conventional solvent wherein vinylene carbonate as film forming chemical compound was added to the mixed solvent of ethylene carbonate and ethyl methyl carbonate.

It is noted that the secondary battery of Comparative Example 3 utilizing chain fluorinated carboxylic acid ester represented by the above formula (1) wherein x is 1 showed greater decrease in both of percentage of residual capacity and percentage of recovery capacity after storage as compared with the secondary batteries of Examples 1 to 7 utilizing chain fluorinated carboxylic acid ester represented by the above formula (1) wherein x is 2 or 3. The reason is thought to be the following. Chain fluorinated carboxylic acid ester represented by the above formula (1) wherein x is 1 is hydrolyzed and easily generates acetic acid as compared with chain fluorinated carboxylic acid ester represented by the above formula (1) wherein x is 2 or 3. In such chain fluorinated carboxylic acid ester having such low stability, decrease of battery capacity after storage was caused.

Further, the non-aqueous electrolyte secondary battery of Comparative Example 4 utilizing chain fluorinated carboxylic acid ester of $CHF_2COOCH_3$ wherein hydrogen combined with α carbon was replaced with fluorine exhibited great decrease in both of percentage of residual capacity and percentage of recovery capacity after storage. This is thought to be a result from a reaction between the non-aqueous electrolyte and the negative electrode caused by decrease of electron density of carbonyl carbon being next to α carbon by combining α carbon with fluorine having high electron-withdrawing property.

Then, each of the non-aqueous electrolyte secondary batteries of Examples 1 and 2 was measured of battery voltage, and the results were shown in Table 3 below.

TABLE 3

| Non-Aqueous Solvent (volume ratio) | Battery voltage (V) | |
| --- | --- | --- |
| | Before Preservation | After Preservation |
| Ex. 1  4-FEC:$CH_3COOCH_2CHF_2$ (2:8) | 4.19 | 4.14 |
| Ex. 2  4-FEC:$CH_3COOCH_2CF_3$ (2:8) | 4.19 | 4.13 |

According to the results, reduction of battery voltage after storage was restricted in the secondary battery of Example 1 utilizing chain fluorinated carboxylic acid ester $CH_3COOCH_2CHF_2$ represented by the above formula (1) wherein x is 2 as compared with the secondary battery of Example 2 utilizing chain fluorinated carboxylic acid ester $CH_3COOCH_2CF_3$ represented by the above formula (1) wherein x is 3, and therefore, the secondary battery of Example 1 exhibited higher battery voltage after storage as compared with the secondary battery of Example 2.

It is believed that, although the detailed reason is not clear, because a boiling point of $CH_3COOCH_2CF_3$ represented by the above formula (1) wherein x is 3 is about 78° C. while the boiling point of $CH_3COOCH_2CHF_2$ represented by the above formula (1) wherein x is 2 is about 105° C., $CH_3COOCH_2CF_3$ having lower boiling point is easily reacted with the electrode during storage. Further, as described below, one of the reasons is though to be because the use of $CH_3COOCH_2CHF_2$ represented by the above formula (1) wherein x is 2 contributes to form the film having excellent durability on the negative electrode.

Next, each of load characteristics of the secondary batteries of Examples 1, 3 and 4 wherein the ratio of chain carboxylic acid ester of $CH_3COOCH_2CHF_2$ in the non-aqueous solvent was different was evaluated.

In the evaluation of load characteristics, each of the secondary batteries was charged at a constant current of 2300 mA at 25° C. until a voltage became 4.2 V and further charged at the constant voltage of 4.2 V until the current became 46 mA.

Further, each of the secondary batteries charged was discharged at each of currents of 460 mA (0.2 C) and 4600 mA (2 C) until each voltage became 2.75 V. Then, discharge capacity Q0.2 C in the case of discharge at 460 mA (0.2 C) and discharge capacity Q2 C in the case of discharge at 4600 mA (2 C) were measured. Next, each of load characteristics was determined by the below formula. The results were shown in Table 4 below.

Load Characteristics (%)=($Q2\ C/Q0.2\ C$)×100

TABLE 4

| Non-Aqueous Solvent (volume ratio) | Load Characteristics (%) |
| --- | --- |
| Ex. 1  4-FEC:$CH_3COOCH_2CHF_2$ (2:8) | 95 |
| Ex. 3  4-FEC:$CH_3COOCH_2CHF_2$ (1:9) | 94 |
| Ex. 4  4-FEC:$CH_3COOCH_2CHF_2$:DMC (2:4:4) | 97 |

As apparent from the results, the secondary battery of Example 3 wherein the ratio of chain fluorinated carboxylic acid ester was 90 volume % showed lower value of load characteristics and was inferior in load characteristics as compared with the secondary battery of Example 1 wherein the ratio of chain fluorinated carboxylic acid ester was 80 volume % and the secondary battery of Example 4 wherein the ratio of chain fluorinated carboxylic acid ester was 40 volume %. This is thought to be because viscosity of the non-aqueous electrolyte is increased by increment of ratio of chain fluorinated carboxylic acid ester.

Therefore, it is thought to be preferable that the ratio of chain fluorinated carboxylic acid ester represented by the above formula (1) is in the range of 20 to 80 volume %.

Next, a test for comparison of CV characteristics between the case of using $CH_3COOCH_2CHF_2$ represented by the above formula (1) wherein x is 2 and the case of using $CH_3COOCH_2CF_3$ represented by the above formula (1) wherein x is 3 was operated by using the non-aqueous solvent which does not contain 4-fluoroethylene carbonate as film forming chemical compound.

Operative Example 1

In Operative Example 1, a non-aqueous electrolyte was prepared as follows. As the non-aqueous solvent, only chain fluorinated carboxylic acid ester $CH_3COOCH_2CHF_2$ represented by the above formula (1) wherein x is 2 was used. Then, lithium hexafluorophosphate $LiPF_6$ was dissolved in a concentration of 1 mol/l to the non-aqueous solvent. Thus was prepared the non-aqueous electrolyte.

Operative Example 2

In Operative Example 2, a non-aqueous electrolyte was prepared as follows. As the non-aqueous solvent, only chain fluorinated carboxylic acid ester $CH_3COOCH_2CF_3$ represented by the above formula (1) wherein x is 3 was used. Then, lithium hexafluorophosphate $LiPF_6$ was dissolved in a concentration of 1 mol/l to the non-aqueous solvent. Thus was prepared the non-aqueous electrolyte.

Figure 2:
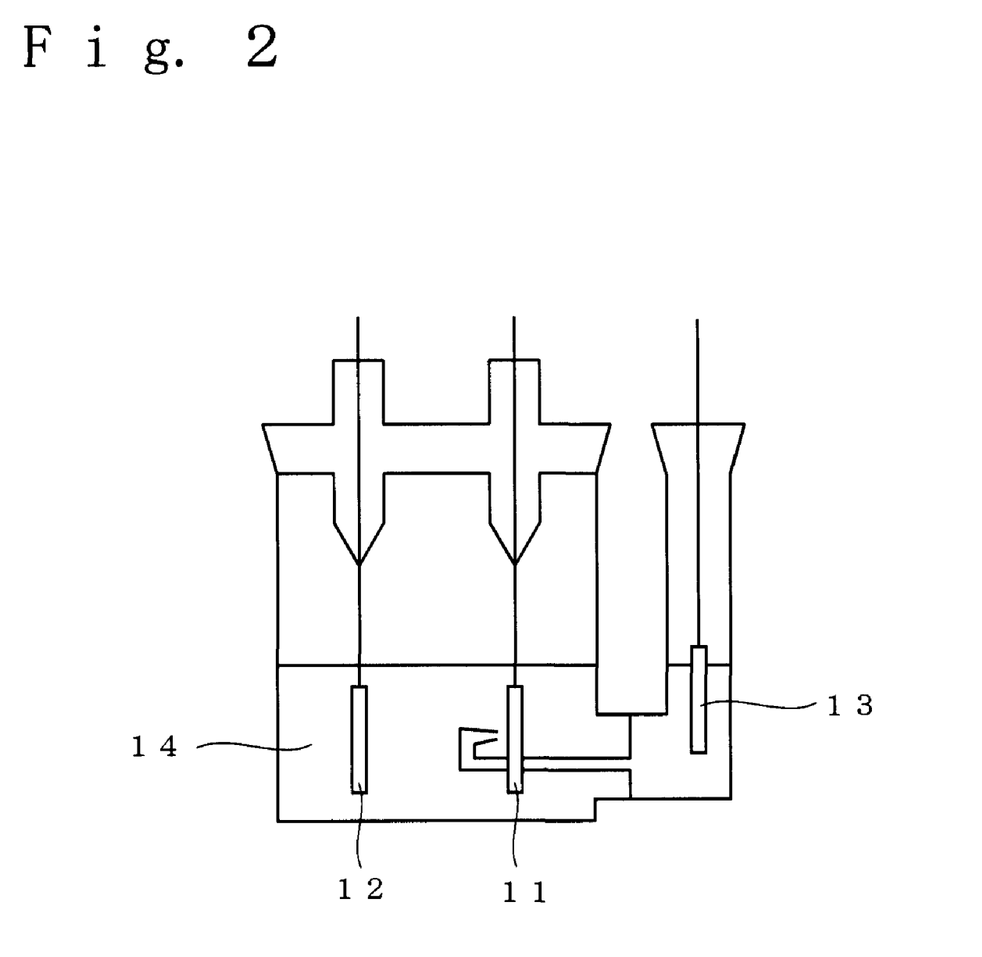
FIG. 2 is a schematic view illustrating a three-electrode type test cell fabricated in Operative Examples of the present invention wherein type of chain fluorinated carboxylic acid ester contained in the non-aqueous solvent is changed.

Then, each of the non-aqueous electrolyte of Examples 1 and 2 was used to fabricate each three-electrode type test cell illustrated in FIG. 2.

In each three-electrode type test cell, the negative electrode fabricated in Example 1 cut in prescribed size was used as a working electrode 11. Further, metal lithium was used as a counter electrode 12 and a reference electrode 13. Then, these electrodes were soaked in each non-aqueous electrolyte 14.

Next, as to each three-electrode type test cell, CV measurement was conducted by scanning potential of the working electrode 11 against the reference electrode 13 from the initial potential to 0 V and thereafter to 2 V at sweep rate of 1 mV/s. Then, the result of CV measurement conducted on the three-electrode type test cell using the non-aqueous electrolyte of Operative Example 1 was shown in FIG. 3 and the result of CV measurement conducted on the three-electrode type test cell using the non-aqueous electrolyte of Operative Example 2 was shown in FIG. 4.

Figure 3:
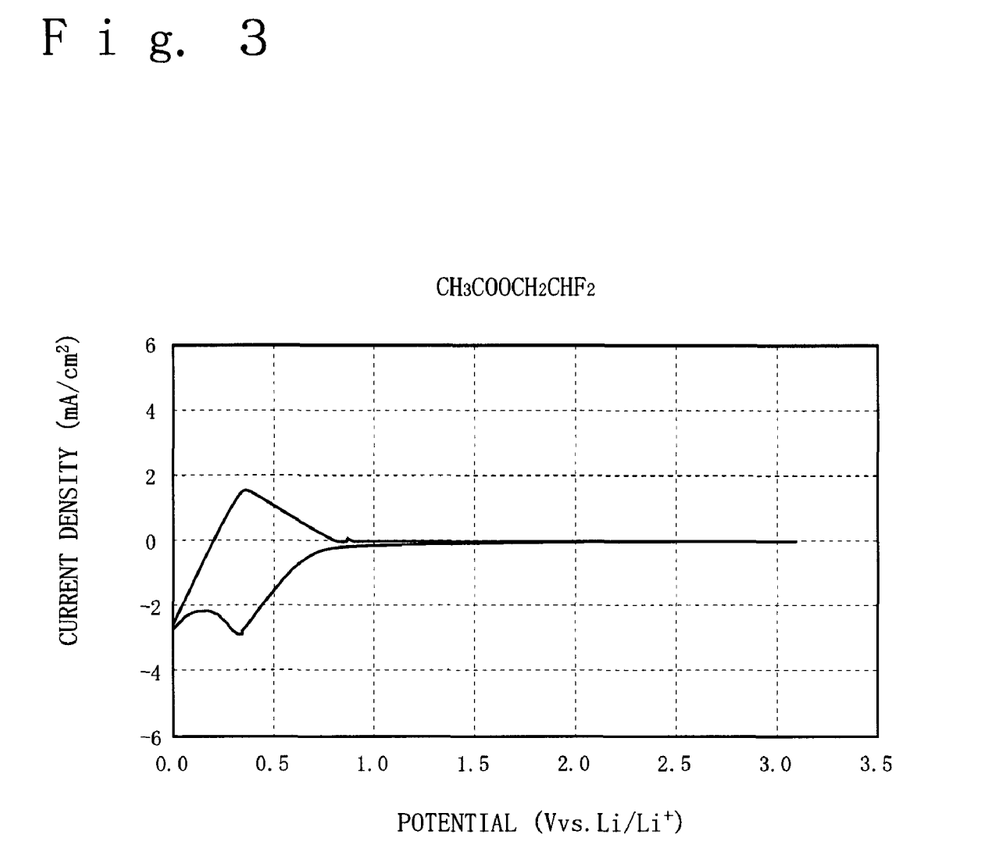
FIG. 3 is a graph showing results of CV measurement conducted on a three-electrode type test cell using the non-aqueous electrolyte of Operative Example 1.
Figure 4:
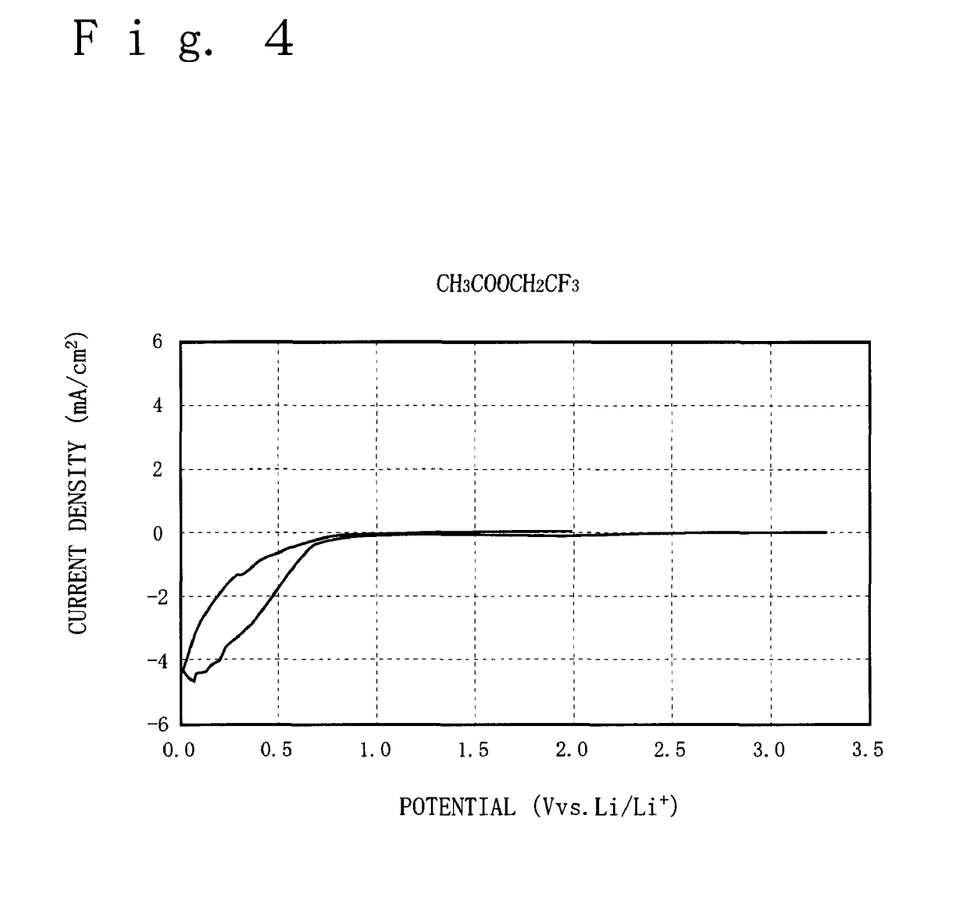
FIG. 4 is a graph showing results of CV measurement conducted on a three-electrode type test cell using the non-aqueous electrolyte of Operative Example 2.

The results showed that a peak associated with insertion or de-insertion of lithium was observed in the three-electrode type test cell of Operative Example 1 using the non-aqueous solvent comprised of only $CH_3COOCH_2CHF_2$ represented by the above formula (1) wherein x is 2. Therefore, it is thought to be that even in the case of using $CH_3COOCH_2CHF_2$ alone, a film is formed on the negative electrode as the working electrode. On the other hand, in the three-electrode type test cell of Operative Example 2 using the non-aqueous solvent comprised of only $CH_3COOCH_2CF_3$ represented by the above formula (1) wherein x is 3, the peak associated with insertion or de-insertion of lithium was not observed. Accordingly, it is thought to be that in the case that only $CH_3COOCH_2CF_3$ was used alone, a film is not formed on the negative electrode as the working electrode.

Further, as exemplified in Example 1, in the case that $CH_3COOCH_2CHF_2$ represented by the above formula (1) wherein x is 2 and 4-fluoroethylene carbonate as film forming chemical compound were contained in the non-aqueous solvent, both of $CH_3COOCH_2CHF_2$ and 4-fluoroethylene carbonate contribute to form a film on the negative electrode. Still further, as compared with the case that $CH_3COOCH_2CF_3$ represented by the above formula (1) wherein x is 3 and 4-fluoroethylene carbonate as film forming chemical compound were contained in the non-aqueous solvent as in Example 2, in the case that $CH_3COOCH_2CHF_2$ represented by the above formula (1) wherein x is 2 and 4-fluoroethylene carbonate as film forming chemical compound were contained in the non-aqueous solvent as in Example 1, a film having higher durability was formed on the negative electrode.

As a result, as compared with the non-aqueous solvent of Example 2, it is thought to be that storage properties are more improved in the non-aqueous solvent of Example 1 containing $CH_3COOCH_2CHF_2$ represented by the above formula (1) wherein x is 2 and 4-fluoroethylene carbonate as film forming chemical compound.

Although the present invention has been fully described by way of examples, it is to be noted that various changes and modification will be apparent to those skilled in the art.

Therefore, unless otherwise such changes and modifications depart from the scope of the invention, they should be construed as being included therein.

The invention claimed is:

1. A non-aqueous electrolyte for secondary battery comprising a non-aqueous solvent dissolving lithium salt of an electrolyte,
    wherein the non-aqueous solvent contains: chain fluorinated carboxylic acid ester represented by the below formula (1), and a film forming chemical compound decomposed in the range of +1.0 to 3.0 V based on an equilibrium potential between metal lithium and lithium ion:

$$CH_3COOCH_2CH_{3-x}F_x \quad (1)$$

wherein in the above formula (1), x is 2 or 3.

2. The non-aqueous electrolyte for secondary battery as claimed in claim 1, wherein said chain fluorinated carboxylic acid ester is 2,2-difluoroethyl acetate $CH_3COOCH_2CHF_2$.

3. The non-aqueous electrolyte for secondary battery as claimed in claim 1, wherein said film forming chemical compound is at least one selected from 4-fluoroethylene carbonate and its derivatives, ethylene sulfite and its derivatives, vinyl ethylene carbonate and its derivatives, $LiB(C_2O_4)_2$, and $LiBF_2(C_2O_4)$.

4. The non-aqueous electrolyte for secondary battery as claimed in claim 3, wherein said film forming chemical compound is 4-fluoroethylene carbonate.

5. The non-aqueous electrolyte for secondary battery as claimed in claim 4, wherein the content of said 4-fluoroethylene carbonate is in the range of 5 to 30 volume % to the whole amount of non-aqueous solvent.

6. The non-aqueous electrolyte for secondary battery as claimed in claim 2, wherein said film forming chemical compound is at least one selected from 4-fluoroethylene carbonate and its derivatives, ethylene sulfite and its derivatives, vinyl ethylene carbonate and its derivatives, and $LiB(C_2O_4)_2$ and $LiBF_2(C_2O_4)$.

7. The non-aqueous electrolyte for secondary battery as claimed in claim 2, wherein said film forming chemical compound is 4-fluoroethylene carbonate.

8. The non-aqueous electrolyte for secondary battery as claimed in claim 7, wherein the content of said 4-fluoroethylene carbonate is in the range of 5 to 30 volume % to the whole amount of non-aqueous solvent.

9. The non-aqueous electrolyte for secondary battery as claimed in claim 2, wherein the content of said chain fluorinated carboxylic acid ester is in the range of 5 to 90 volume % to the whole amount of non-aqueous solvent.

10. The non-aqueous electrolyte for secondary battery as claimed in claim 7, wherein the content of said 2,2-difluoroethyl acetate $CH_3COOCH_2CHF_2$ is in the range of 5 to 90 volume % to the whole amount of non-aqueous solvent.

11. The non-aqueous electrolyte for secondary battery as claimed in claim 9, wherein the content of said chain fluorinated carboxylic acid ester is in the range of 20 to 80 volume % to the whole amount of non-aqueous solvent.

12. The non-aqueous electrolyte for secondary battery as claimed in claim 10, wherein the content of said 2,2-difluoroethyl acetate $CH_3COOCH_2CHF_2$ is in the range of 20 to 80 volume % to the whole amount of non-aqueous solvent.

13. A non-aqueous electrolyte secondary battery comprising a positive electrode, a negative electrode, a separator and a non-aqueous electrolyte, wherein said non-aqueous electrolyte is the non-aqueous electrolyte for secondary battery as claimed in claim 1.

14. The non-aqueous electrolyte for secondary battery as claimed in claim 1,
    wherein said chain fluorinated carboxylic acid ester is 2,2,2-trifluoroethyl acetate $CH_3COOCH_2CF_3$.

15. The non-aqueous electrolyte for secondary battery as claimed in claim 3,
    wherein said chain fluorinated carboxylic acid ester is 2,2,2-trifluoroethyl acetate $CH_3COOCH_2CF_3$.

16. The non-aqueous electrolyte for secondary battery as claimed in claim 4, wherein said chain fluorinated carboxylic acid ester is 2,2,2-trifluoroethyl acetate $CH_3COOCH_2CF_3$.

17. The non-aqueous electrolyte for secondary battery as claimed in claim 5,
    wherein said chain fluorinated carboxylic acid ester is 2,2,2-trifluoroethyl acetate $CH_3COOCH_2CF_3$.

18. A non-aqueous electrolyte for secondary battery comprising a non-aqueous solvent dissolving lithium salt of an electrolyte,
    wherein the non-aqueous solvent contains: chain fluorinated carboxylic acid ester represented by a formula (1) $CH_3COOCH_2CH_{3-x}F_x$ wherein x is 2 or 3;
    and a film-forming chemical compound decomposed in the range of +1.0 to 3.0 V based on an equilibrium potential between metal lithium and lithium ion;

wherein the film forming chemical compound contains:
(2) 4-fluoroethylene carbonate; and
(3) at least one selected from ethylene sulfite, vinyl ethylene carbonate, $LiB(C_2O_4)_2$, and $LiBF_2(C_2O_4)$.

19. The non-aqueous electrolyte for secondary battery as claimed in claim 18,
wherein said chain fluorinated carboxylic acid ester is 2,2-difluoroethyl acetate $CH_3COOCH_2CHF_2$.

20. The non-aqueous electrolyte for secondary battery as claimed in claim 18,
wherein the content of said 4-fluoroethylene carbonate is in the range of 5 to 30 volume % to the whole amount of non-aqueous solvent.

21. A non-aqueous electrolyte secondary battery comprising a positive electrode, a negative electrode, a separator and a non-aqueous electrolyte,
wherein said non-aqueous electrolyte is the non-aqueous electrolyte for secondary battery as claimed in claim 14.

22. A non-aqueous electrolyte secondary battery comprising a positive electrode, a negative electrode, a separator and a non-aqueous electrolyte, wherein said non-aqueous electrolyte is the non-aqueous electrolyte for secondary battery as claimed in claim 18.

23. A non-aqueous electrolyte secondary battery comprising a positive electrode, a negative electrode, a separator and a non-aqueous electrolyte,
wherein said non-aqueous electrolyte is the non-aqueous electrolyte for secondary battery as claimed in claim 19.

24. A non-aqueous electrolyte secondary battery comprising a positive electrode, a negative electrode, a separator and a non-aqueous electrolyte,
wherein said non-aqueous electrolyte is the non-aqueous electrolyte for secondary battery as claimed in claim 20.

* * * * *